(12) United States Patent
Piraneque et al.

(10) Patent No.: US 7,551,186 B2
(45) Date of Patent: Jun. 23, 2009

(54) HANDHELD ELECTRONIC DEVICE, SYSTEM AND METHOD FOR INVERTING DISPLAY ORIENTATION FOR LEFT-HANDED OR RIGHT-HANDED OPERATION RESPONSIVE TO A WIRELESS MESSAGE

(75) Inventors: Javier E. Piraneque, Cranberry Township, PA (US); Michael L. McManus, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 725 days.

(21) Appl. No.: 11/063,216

(22) Filed: Feb. 22, 2005

(65) Prior Publication Data

US 2006/0187203 A1 Aug. 24, 2006

(51) Int. Cl.
*G09G 5/00* (2006.01)
*G06F 3/00* (2006.01)
*G06F 9/44* (2006.01)
*G06F 9/46* (2006.01)
*G06F 13/00* (2006.01)

(52) U.S. Cl. .................. 345/659; 345/649; 719/315

(58) Field of Classification Search .......... 345/659, 345/649; 370/254; 719/315, 318
See application file for complete search history.

(56) References Cited

U.S. PATENT DOCUMENTS

| 4,831,368 | A | 5/1989 | Masimo et al. |
|---|---|---|---|
| 4,969,647 | A | 11/1990 | Mical et al. |
| 5,023,438 | A | 6/1991 | Wakatsuki et al. |
| 5,477,508 | A | 12/1995 | Will |
| 5,627,531 | A | 5/1997 | Posso et al. |
| 5,710,728 | A | 1/1998 | Danielson et al. |
| 5,805,474 | A | 9/1998 | Danielson et al. |
| 5,915,228 | A | 6/1999 | Kunihiro et al. |
| 6,049,813 | A | 4/2000 | Danielson et al. |

(Continued)

OTHER PUBLICATIONS

SearchSecurity.com, "key fob," http://searchsecurity.techtarget.com/sDefinition/0,,sid14_gci795968,00.html, Sep. 22, 2003, 2 pp.
Panasonic, "Slide Switches, Detector Switches, Power/Push Switches", www.digikey.com, pp. 863-864.
GE Industrial Systems, "Electronic House Magazine Names Smart ConnectionCenter and NetworX NX-8E Product of the Year", Aug. 12, 2003, 2 pp.
GE Industrial Systems, "GE Interlogix Releases The Concord Ultra Security System", Sep. 2, 2003, 2 pp.

*Primary Examiner*—Kee M Tung
*Assistant Examiner*—Jacinta Crawford
(74) *Attorney, Agent, or Firm*—Martin J. Moran

(57) ABSTRACT

A handheld electronic device, such as a fob, includes a wireless communication port and a display alternatively displaying a first or right-handed display orientation and a second or left-handed display orientation. The first display orientation is inverted with respect to the second display orientation. A processor component cooperates with the wireless communication port and the display. The processor component is adapted to receive a wireless radio frequency message including one of a first state and a different second state from the wireless communication port. The processor component then responsively configures the display in the first display orientation responsive to the first state or alternatively configures the display in the second display orientation responsive to the second state.

18 Claims, 10 Drawing Sheets

U.S. PATENT DOCUMENTS

| | | |
|---|---|---|
| 6,128,553 A | 10/2000 | Gordon et al. |
| 6,297,795 B1 | 10/2001 | Kato et al. |
| 6,359,239 B1 | 3/2002 | Missler et al. |
| 6,546,231 B1 | 4/2003 | Someya et al. |
| 6,669,362 B1 | 12/2003 | Lin et al. |
| 6,741,232 B1 | 5/2004 | Siedlikowski et al. |
| 6,901,274 B2 * | 5/2005 | Idani et al. .................. 455/566 |
| 6,982,728 B1 * | 1/2006 | Nicolas et al. .............. 345/649 |
| 2004/0046751 A1 | 3/2004 | Heimermann et al. |
| 2004/0164973 A1 | 8/2004 | Nakano et al. |
| 2004/0233855 A1 * | 11/2004 | Gutierrez et al. ............ 370/252 |
| 2005/0262519 A1 * | 11/2005 | Luebke et al. ............... 719/318 |

* cited by examiner

HANDHELD ELECTRONIC DEVICE, SYSTEM AND METHOD FOR INVERTING DISPLAY ORIENTATION FOR LEFT-HANDED OR RIGHT-HANDED OPERATION RESPONSIVE TO A WIRELESS MESSAGE

BACKGROUND OF THE INVENTION

1. Field of the Invention

This invention pertains generally to handheld electronic devices and, more particularly, to handheld electronic devices employing an invertible display. The invention also relates to systems and methods employing handheld electronic devices with an invertible display.

2. Background Information

Wireless communication networks are an emerging new technology, which allows users to access information and services electronically, regardless of their geographic position.

In contrast to wired networks, mesh-type, low rate—wireless personal area network (LR-WPAN) wireless communication networks are intended to be relatively low power, to be self-configuring, and to not require any communication infrastructure (e.g., wires) other than power sources.

Home (e.g., residential; house; apartment) monitoring, security, and automation (control) systems are well known.

U.S. Pat. No. 4,969,647 discloses an invertible hand-held electronic game apparatus including pushbutton switches that are depressed simultaneously by a user to invert the display of images. A display inversion circuit allows the apparatus housing to be inverted for right-handed play or left-handed play in a horizontal orientation, and for right hand above and left hand below, or for right hand below and left hand above positioning when the images are vertically oriented.

U.S. Pat. No. 5,023,438 discloses a bar code reader integrated with a data input apparatus. Two display mode changing switches permit characters displayed on a display device to be inverted in vertical and horizontal directions. Thus, either a right-handed person or a left-handed person can always see the read data and key-input in the erected image. When a right-handed person operates the portable data input apparatus, he grasps the handle portion with his right hand, with a keyboard and display device facing him. The display mode changing switch provided on the lower side of the casing is operated by his right thumb. When a left-handed person operates the portable data input apparatus, she grasps the handle portion with her left hand, with the keyboard and display device facing her. In this case, since the handle portion is grasped with her left hand, the positions of the keyboard and two display mode changing switches are inevitably inverted, and the lower-side display mode changing switch is turned on by her left thumb.

U.S. Pat. No. 6,359,239 discloses a cutting board including a visual display. The orientation of the read-out may be inverted by a selector switch, in order that the board may be turned around to accommodate either a left-handed or a right-handed user.

There is room for improvement in handheld electronic devices. There is also room for improvement in systems and methods employing handheld electronic devices.

SUMMARY OF THE INVENTION

These needs and others are met by the present invention, which provides a handheld electronic device that receives a wireless message including one of a first state and a different second state from a wireless communication port. The handheld electronic device responsively configures its display in a first display orientation responsive to the first state and alternatively configures the display in an inverted second display orientation responsive to the second state.

In accordance with one aspect of the invention, a handheld electronic device comprises: a wireless communication port; a display alternatively displaying a first display orientation and a second display orientation, the first display orientation being inverted with respect to the second display orientation; and a processor component cooperating with the wireless communication port and the display, the processor component being adapted to receive a wireless message including one of a first state and a different second state from the wireless communication port and to responsively configure the display in the first display orientation responsive to the first state and to alternatively configure the display in the second display orientation responsive to the second state.

The wireless communication port may be adapted to wirelessly communicate with a wireless communication port of a server.

The processor component may comprise a proximity sensor adapted to detect mating of the handheld electronic device with another device. The processor component may be further adapted to detect mating of the handheld electronic device with the other device in one of a first mating orientation and a different second mating orientation and to responsively reconfigure the display in the first display orientation responsive to the first mating orientation and to alternatively reconfigure the display in the second display orientation responsive to the second mating orientation.

As another aspect of the invention, a home system comprises: a server comprising a first wireless communication port and a second port; a handheld electronic device comprising a display and a third wireless communication port adapted to communicate with the first wireless communication port of the server, the display alternatively displaying a first display orientation and a second display orientation, the first display orientation being inverted with respect to the second display orientation; and at least one node different than the handheld electronic device, wherein the handheld electronic device is adapted to mate with the second port of the server in one of a first mating orientation and a different second mating orientation, wherein the server is adapted to send a wireless message from the first wireless communication port of the server to the third wireless communication port of the handheld electronic device, the wireless message including one of a first state corresponding to the first mating orientation and a different second state corresponding to the different second mating orientation, and wherein the handheld electronic device is further adapted to configure the display in the first display orientation responsive to the first state and to alternatively configure the display in the second display orientation responsive to the second state.

As another aspect of the invention, a method of configuring a display orientation comprises: employing a server comprising a first wireless communication port and a second port; employing a handheld electronic device comprising a display and a third wireless communication port adapted to communicate with the first wireless communication port of the server; alternatively displaying a first display orientation and a second display orientation of the display, the first display orientation being inverted with respect to the second display orientation; mating the handheld electronic device with the second port of the server in one of a first mating orientation and a different second mating orientation; sending a wireless message including a first state responsive to the first mating orientation and a different second state responsive to the second mating orientation from the first wireless communication port of the server to the third wireless communication port of the handheld electronic device; and configuring the display in the first display orientation responsive to the first state and alternatively configuring the display in the second display orientation responsive to the second state.

The method may dispose the display of the handheld electronic device between a first side and an opposite second side of the handheld electronic device; dispose a user input device proximate the display, with the user input device being between the first side and the opposite second side of the handheld electronic device; and employ the first display orientation for a right-handed user and alternatively employ the second display orientation for a left-handed user.

The method may further comprise employing a channel in the server including a first end having a first proximity sensor and a first target and a second end having a second proximity sensor and a second target; employing a first side including a first proximity sensor and a first target and an opposite second side including a second proximity sensor and a second target of the handheld electronic device; mating the first side of the handheld electronic device with the channel of the server in the first mating orientation with the first proximity sensor of the handheld electronic device being proximate the first target of the server and with the first target of the handheld electronic device being proximate the first proximity sensor of the server, and responsively sending the wireless message including the first state; and alternatively mating the second side of the handheld electronic device with the channel of the server in the second mating orientation with the second proximity sensor of the handheld electronic device being proximate the second target of the server and with the second target of the handheld electronic device being proximate the second proximity sensor of the server, and responsively sending the wireless message including the second state.

The method may include first and second proximity sensors with the handheld electronic device; mate the handheld electronic device with a node different than the handheld electronic device; determine the first and second mating orientations from the first and second proximity sensors of the handheld electronic device; and reconfigure the first display orientation responsive to the determined first mating orientation from the first proximity sensor of the handheld electronic device or the second display orientation responsive to the determined second mating orientation from the second proximity sensor of the handheld electronic device.

As another aspect of the invention, a sub-system for monitoring, configuring or controlling a home system comprises: a node comprising a mating portion and a target; and a handheld electronic device comprising: a portable housing including a first side and an opposite second side, the first side being adapted to mate with the mating portion of the node in a first mating orientation, the second side being adapted to mate with the mating portion of the node in a different second mating orientation, a first proximity sensor disposed toward the first side of the portable housing, a second proximity sensor disposed toward the second side of the portable housing, a display disposed between the first and second sides of the portable housing, and a processor cooperating with the first and second proximity sensors and being adapted to configure the display in a first display orientation responsive to the first proximity sensor detecting the target of the node and to alternatively configure the display in a second display orientation responsive to the second proximity sensor detecting the target of the node, the first display orientation being inverted with respect to the second display orientation.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
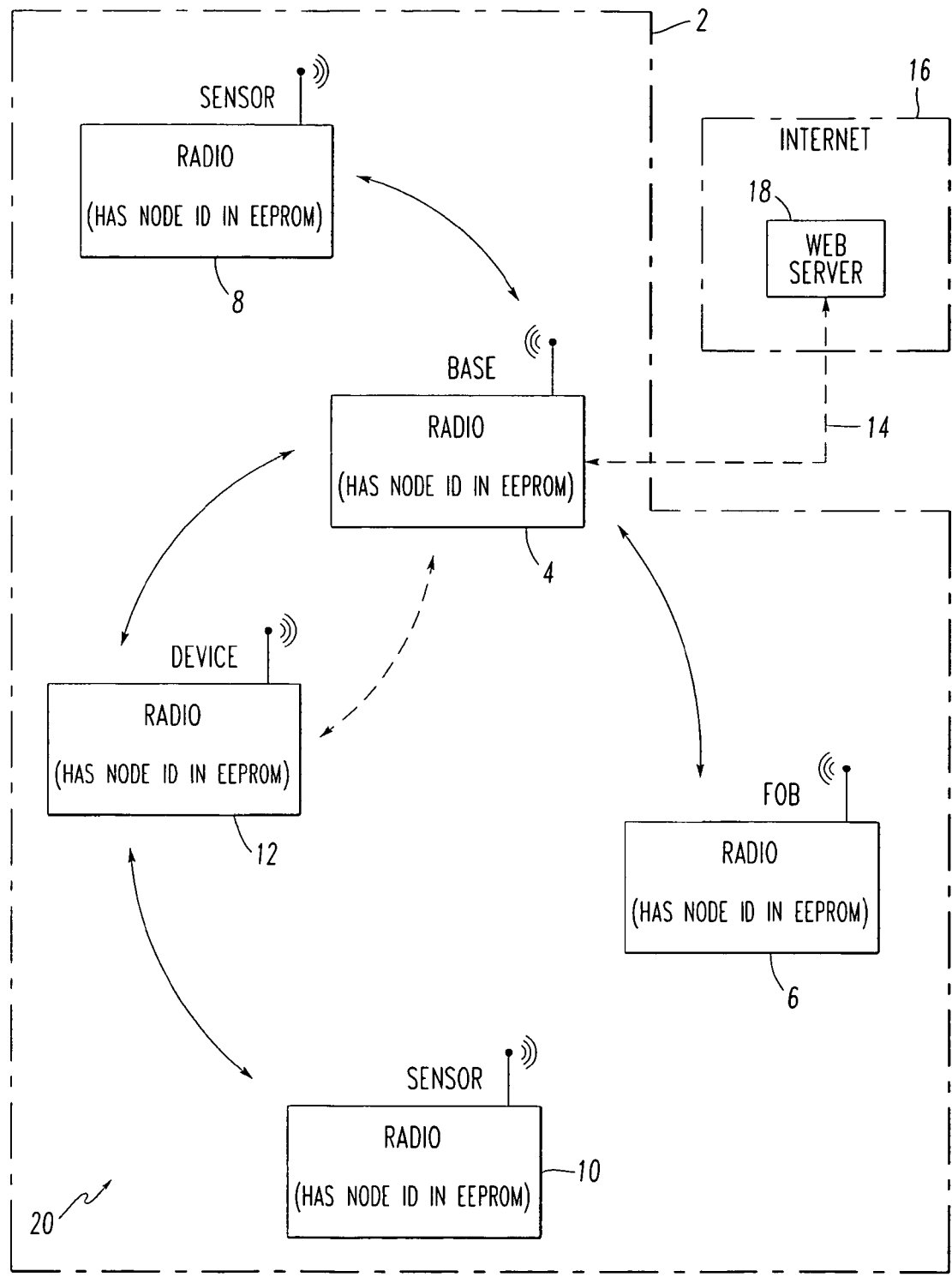
FIG. 1 is a block diagram of a home wellness system in accordance with the present invention.

As employed herein, the term "wireless" shall expressly include, but not be limited by, radio frequency (RF), infrared, wireless area networks, IEEE 802.11 (e.g., 802.11a; 802.11b; 802.11g), IEEE 802.15 (e.g., 802.15.1; 802.15.3, 802.15.4), other wireless communication standards, DECT, PWT, pager, PCS, Wi-Fi, Bluetooth™, and cellular.

As employed herein, the term "communication network" shall expressly include, but not be limited by, any local area network (LAN), wide area network (WAN), intranet, extranet, global communication network, the Internet, and/or wireless communication network.

As employed herein, the term "portable wireless communicating device" shall expressly include, but not be limited by, any portable communicating device having a wireless communication port (e.g., a portable wireless device; a portable personal computer (PC); a Personal Digital Assistant (PDA); a data phone).

As employed herein, the term "fob" shall expressly include, but not be limited by, a portable wireless communicating device; a wireless network device; a wireless object that is directly or indirectly carried by a person; a wireless object that is worn by a person; a wireless object that is placed on or coupled to a household object (e.g., a refrigerator; a table); a wireless object that is coupled to or carried by a personal object (e.g., a purse; a wallet; a credit card case); a portable wireless object; and/or a handheld wireless object.

As employed herein, the term "handheld electronic device" shall expressly include, but not be limited by, a fob and/or other handheld electronic objects.

As employed herein, the term "network coordinator" (NC) shall expressly include, but not be limited by, any communicating device, which operates as the coordinator for devices wanting to join a communication network and/or as a central controller in a wireless communication network.

As employed herein, the term "network device" (ND) shall expressly include, but not be limited by, any communicating device (e.g., a portable wireless communicating device; a fob; a camera/sensor device; a wireless camera; a control device; and/or a fixed wireless communicating device, such as, for example, switch sensors, motion sensors or temperature sensors as employed in a wirelessly enabled sensor network), which participates in a wireless communication network, and which is not a network coordinator.

As employed herein, the term "node" includes NDs and NCs.

As employed herein, the term "headless" means without any user input device and without any display device.

As employed herein, the term "server" shall expressly include, but not be limited by, a "headless" base station; and/or a network coordinator.

As employed herein, the term "residence" shall expressly include, but not be limited by, a home, apartment, dwelling, office and/or place where a person or persons reside(s) and/or work(s).

As employed herein, the term "home system" shall expressly include, but not be limited by, a system for a home or other type of residence.

As employed herein, a home wellness system shall expressly include, but not be limited by, a home system for monitoring and/or configuring and/or controlling aspects of a home or other type of residence.

The present invention is described in association with a wireless fob, although the invention is applicable to a wide range of wireless handheld electronic devices.

FIG. 1 is a block diagram of a wireless home wellness system 2. The system 2 includes a "headless" RF base station 4, a portable RF fob or "house key" 6, a plurality of RF sensors, such as 8,10, and one or more RF output devices, such as 12 (only one device 12 is shown in FIG. 1). The RF base station 4 may include a suitable link 14 (e.g., telephone; DSL; Ethernet) to the Internet 16 and, thus, to a web server 18. The sensors 8,10 may include, for example, the analog sensor 8 and the on/off digital detector 10. The device 12 may include, for example, a water valve and/or a wide range of output devices. The sensors 8,10, device 12, base station 4 and fob 6 all employ relatively short distance, relatively very low power, RF communications. These nodes 4,6,8,10,12 form a wireless network 20 in which the node ID for each of such nodes is unique and preferably is stored in a suitable nonvolatile memory, such as EEPROM, on each such node.

The base station 4 (e.g., a wireless web server; a network coordinator) may collect data from the sensors 8,10 and "page," or otherwise send an RF alert message to, the fob 6 in the event that a critical status changes at one or more of such sensors.

The fob 6 may be employed as both a portable in-home monitor for the various sensors 8,10 and device 12, also, as a portable configuration tool for the base station 4 and such sensors and such device, and, further, as a remote control for such device.

The example base station 4 is headless and includes no user interface. Alternatively, the invention is applicable to servers, such as base stations, having a local or remote user interface. The sensors 8,10 preferably include no user interface, although some sensors may have a status indicator (e.g., an LED (not shown)). The user interface functions are provided by the fob 6 as will be discussed in greater detail, below. As shown with the device 12, the network 20 preferably employs an adhoc, multihop capability, in which the sensors 8,10, the device 12 and the fob 6 do not have to be within range of the base station 4, in order to communicate.

Figure 2:
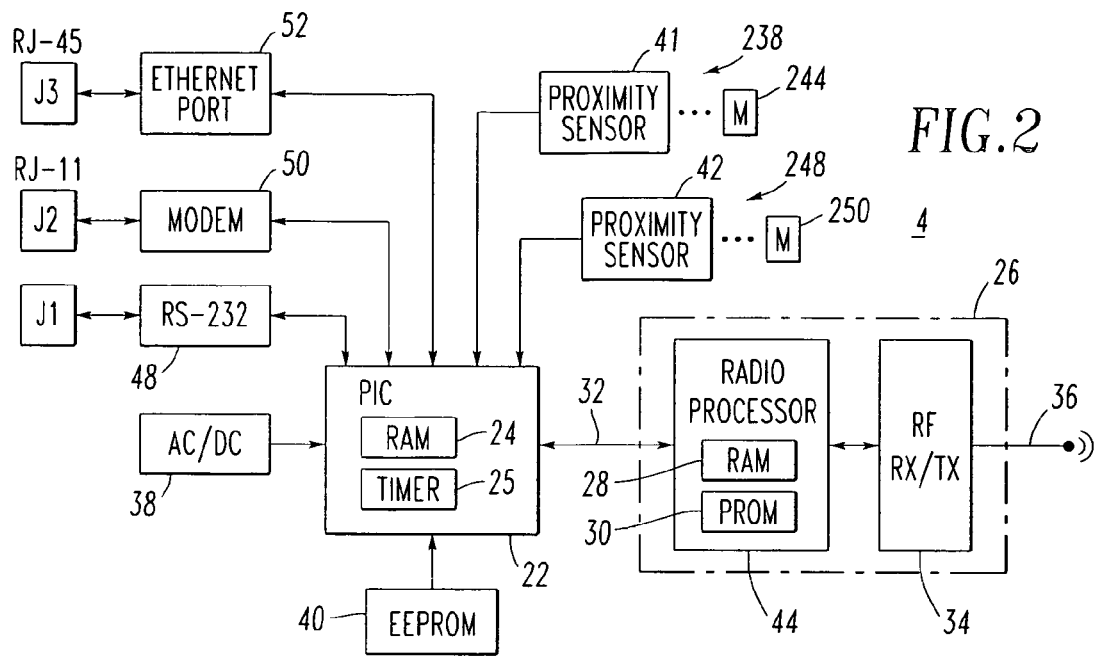
FIG. 2 is a block diagram of the base station of FIG. 1.

FIG. 2 shows the base station 4 of FIG. 1. The base station 4 includes a suitable first processor 22 (e.g., PIC® model 18F2320, marketed by Microchip Technology Inc. of Chandler, Ariz.), having RAM memory 24 and a suitable second radio or RF processor 26 having RAM 28 and PROM 30 memory. The first and second processors 22,26 communicate through a suitable serial interface (e.g., SCI; SPI) 32. The second processor 26, in turn, employs an RF transceiver (RX/TX) 34 having an external antenna 36. As shown with the processor 22, the various base station components receive power from a suitable AC/DC power supply 38. The first processor 22 receives inputs from a timer 25 and one or more proximity sensors 41,42 (e.g., which detect mating or engagement with the fob 6 of FIG. 1). The EEPROM memory 40 is employed to store the unique ID of the base station 4 as well as other nonvolatile information such as, for example, the unique IDs of other nodes, which are part of the wireless network 20, and other configuration related information. The second processor 26 may be, for example, a CC1010 RF Transceiver marketed by Chipcon AS of Oslo, Norway. The processor 26 incorporates a suitable microcontroller core 44, the relatively very low-power RF transceiver 34, and hardware DES encryption/decryption (not shown).

The base station 4 preferably also includes one or more interfaces 48,50,52 to a personal computer (PC) (not shown), a telephone line (not shown) and a network, such as an Ethernet local area network (LAN) (not shown). In this example, the PIC processor 22 communicates with a local PC through a suitable RS-232 interface 48 and connector J1, with a telephone line through a suitable modem 50 and connector J2, and with an Ethernet LAN through an Ethernet port 52 and connector J3. Hence, the modem 50 may facilitate communications with a remote cellular telephone, other portable electronic device (e.g., a PDA (not shown)) or a remote service provider (not shown), and the Ethernet port 52 may provide communications with the Internet 16 of FIG. 1 and, thus, with a remote PC or other client device (not shown).

Figure 3:
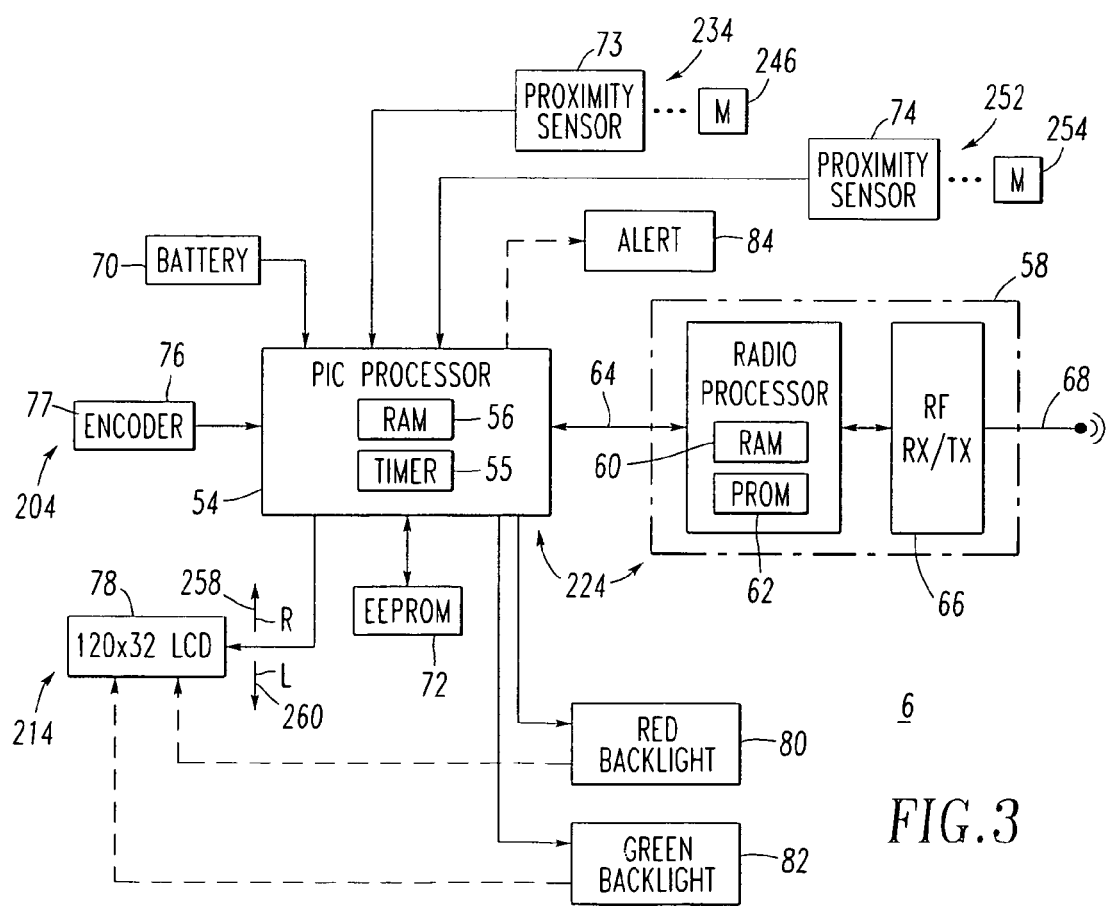
FIG. 3 is a block diagram of the fob of FIG. 1.

FIG. 3 is a block diagram of the fob 6 of FIG. 1. The fob 6 includes a suitable first processor 54 (e.g., PIC) having RAM memory 56 and a suitable second radio or RF processor 58 having RAM 60 and PROM 62 memory. The first and second processors 54,58 communicate through suitable serial interface (e.g., SCI; SPI) 64. The EEPROM memory 72 is employed to store the unique ID of the fob 6 as well as other nonvolatile information. For example, there may be a nonvolatile storage for icons, character/font sets and sensor labels (e.g., the base station 4 sends a message indicating that an on/off sensor or device is ready to configure, and the fob 6 looks up the on/off sensor or device and finds a predefined list of names to choose from). This expedites a relatively rapid interaction. The fob 6 may also employ a short term memory cache (not shown) that is used when the fob 6 is out of range of the base station 4. This stores the list of known sensors and devices and their last two states. This permits the user, even if away, to review, for example, what door was open or what valve was closed, when the fob 6 was last in range.

The second processor 58, in turn, employs an RF transceiver (RX/TX) 66 having an antenna 68 (e.g., which is internal to the fob 6). As shown with the processor 54, the various components of the fob 6 receive power from a battery 70. The first processor 54 receives inputs from a timer 55, one or two suitable sensor/base/device proximity sensors 73,74

Figure 9:
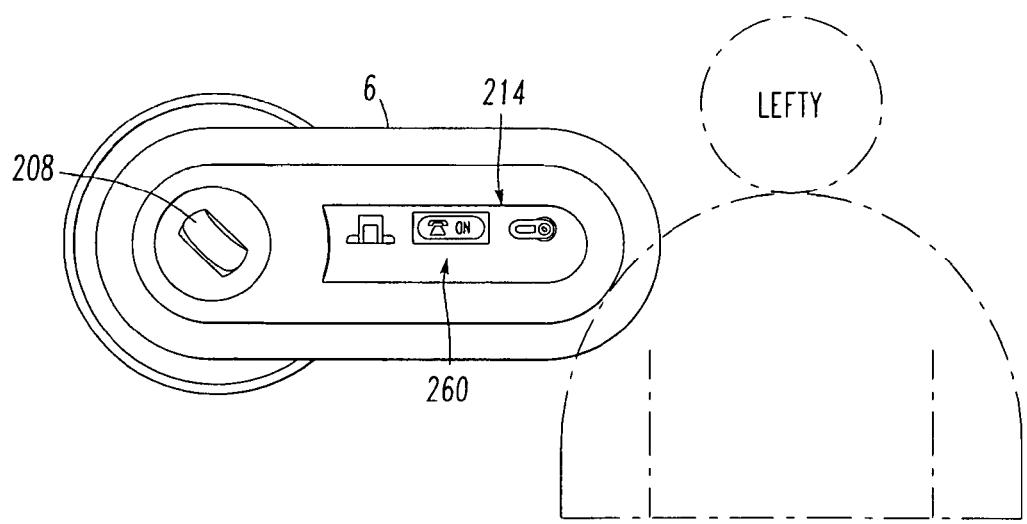
FIG. 9 is vertical elevation view of the fob of FIG. 6 except that it is configured for a left-handed user.

(e.g., which detect mating or engagement with one of the sensors 8,10 or with the device 12 or with the base station 4 of FIG. 1), and a user input device, such as, for example, the exemplary encoder 76 or rotary selector/switch, such as a thumbwheel encoder. Typically, such encoder 76 also includes a button 77, through which the user presses, clicks and/or double-clicks to initiate actions through the fob user interface. The first processor 54 also sends outputs to a suitable display 78 (e.g., a 120×32 LCD), one or more visual alerts, such as a red backlight 80 (e.g., an alert is present) and a green backlight 82 (e.g., no alert is present) for the display 78, and an alert device 84 (e.g., a suitable audible, visual or vibrating device providing, for example, a sound, tone, buzzer, vibration or flashing light). Based upon suitable signals from the processor 54, the example display 78 may readily display information in a normal (FIG. 6) or in a 180° inverted format (FIG. 9).

The proximity sensors 73,74 may include, for example, a magnet and a reed switch (e.g., a magnet and a reed switch proximity sensor in which a corresponding magnet on the opposing device "triggers" it when they are brought within suitable proximity). The reed switch may be, for example, part number RI02-SMD-G2 marketed by Coto Technology of Providence, R.I. The reed switch may be actuated by an electromagnet, a permanent magnet or a combination of both. The magnet, such as 246,254, may be, for example, a neodymium rare earth magnet, part number 43511 Nd disk, marketed by Indigo Instruments of Waterloo, Ontario, Canada.

Alternatively, any suitable device or sensor may be employed to detect that the fob 6 has engaged or is suitably proximate to another system node, such as the base station 4 or sensors 8,10 or device 12 of FIG. 1. Other, non-limiting examples of suitable proximity sensors include an optical (e.g., infrared) transmitter/receiver pair, or an RFID tag/reader pair.

The encoder 76 may be, for example, an AEC11BR series encoder marketed by CUI Inc. of Beaverton, Oreg. Although the encoder 76 is shown, any suitable user input device (e.g., a combined rotary switch and pushbutton; touch pad; joystick button) may be employed. Although the alert device 84 is shown, any suitable annunciator (e.g., an audible generator to generate one or more audible tones to alert the user of one or more corresponding status changes; a vibrational generator to alert the user by sense of feel; a visual indicator, such as, for example, an LED indicator to alert the user of a corresponding status change) may be employed. The display 78 preferably provides both streaming alerts to the user as well as optional information messages.

Figure 4:
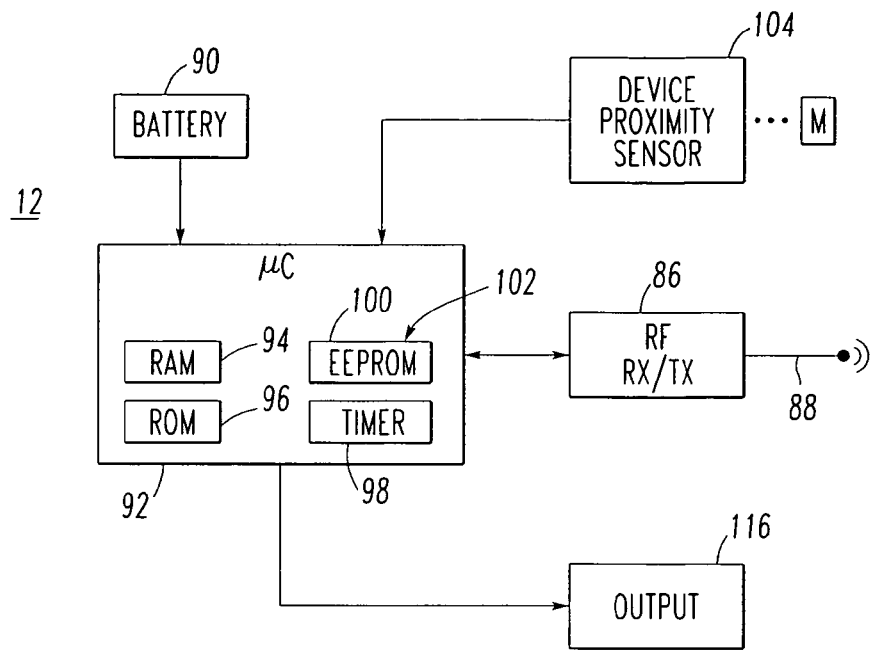
FIG. 4 is a block diagram of the control device of FIG. 1.
Figure 5:
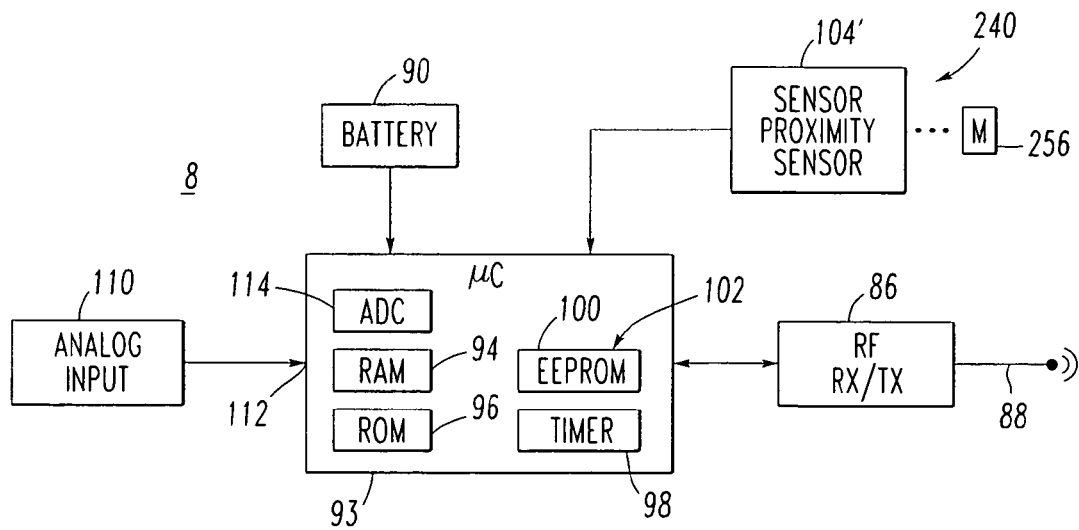
FIG. 5 is a block diagram of one of the input sensors of FIG. 1.

FIGS. 4 and 5 are block diagrams of the device 12 and the analog sensor 8, respectively, of FIG. 1. Each of the device 12 and the sensor 8 includes an RF transceiver (RF RX/TX) 86 having an external antenna 88, a battery 90 for powering the various sensor components, a suitable processor, such as a microcontroller (μC) 92 or 93 having RAM 94, ROM 96, a timer 98 (e.g., in order to provide, for example, a periodic wake-up of the corresponding μC 92 or 93, in order to periodically send device or sensor status information back to the base station 4 of FIG. 1) and other memory (e.g., EEPROM 100 including the unique ID 102 of the node which is stored therein during manufacturing), and a device or sensor proximity sensor 104,104' for mating with one of the fob proximity sensors 73,74 of FIG. 3.

Alternatively, the device 12 may be powered from a suitable AC/DC power source (not shown). The device 12 of FIG. 4 includes a suitable control output 116 (e.g., adapted to open and/or close a water valve). Other non-limiting examples of devices (i.e., output nodes), such as 12, include water valves (shut off; turn on), gas valves (shut off; turn on), electrical switches (power shut off; power turn on), generator (shut off; turn on), garage door (open; close), deadbolt lock (lock; unlock), thermostat (set setpoint), appliance electrical switches (appliance power shut off; appliance power turn on), light switches (shut off lights; turn on lights), communication "firewall" control (enable or secure; disable or insecure), relay device (normally open contact; normally close contact), X10 gateway (enable; disable), camera trigger (trigger snapshot), and water sprinkler (turn on; turn off).

Examples of the sensors 8,10 of FIG. 1 include water leaks; power outages; abnormal temperatures (e.g., home; refrigerator; furnace; air conditioner; heat pump); motion (e.g., child; pet; elderly person; wild animal); alarm (e.g., open or ajar; door; window; cabinet); appliance on (e.g., iron; television; coffee pot); sound (e.g., smoke alarm; intruder alert); status of detached garage; tremor (e.g., earthquake); odor (e.g., natural gas); pressure (e.g., package delivered to front door mat); manual request (e.g., a button is pressed on a "nameable" sensor, such as, for example, "bring takeout" or "out of milk"). The sensors 8,10 may include, for example, conventional security devices (e.g., motion; door status; window status; smoke; fire; heat; gas (e.g., carbon monoxide, natural gas); alarm) and home condition monitors (e.g., moisture; temperature; power; energy (e.g., natural gas; water; electricity; power)).

When a sensor (i.e., input node) (e.g., water sensor), such as 8,10, joins the wireless network 20 of FIG. 1, the user is prompted by the fob 6 to: (1) select a name for the sensor (e.g., washer; water heater; basement); (2) indicate what event or state change will trigger an alert by the base station 4 (e.g., water present; water absent); and (3) the form of alert (e.g., display message on fob 6; audible tone on fob 6; vibration on fob 6; remote telephone call (e.g., through link 14 of FIG. 1); remote e-mail message (e.g., through link 14 of FIG. 1)).

When a device (output node) (e.g., water valve), such as 12, joins the wireless network 20, the user is prompted by the fob 6 to: (1) select a name for the device (e.g., main water shut off valve; water heater valve); (2) select which of the sensors (or other nodes, such as, for example, fob; pager; cellular telephone; PDA; wireless handheld device), such as 8,10, can control it; and (3) configure any logic (e.g., OR; AND; XOR) to be used for multiple sensor or fob inputs. For example, the first time that any device is added to the system 2 of FIG. 1, the user is automatically taken through fob configuration (e.g., training) menus (not shown), in order to confirm the device name, define the critical control state of the device, select the controller(s), and select the alert method.

The analog sensor 8 of FIG. 5 includes a physical analog input interface 110 (e.g., a water detector) with the μC 93 employing an analog input 112 and a corresponding analog-to-digital converter (ADC) 114.

The device 12 of FIG. 4 and the sensor 8 of FIG. 5 do not include an indicator. It will be appreciated, however, that one or both of such device and sensor may employ an indicator (e.g., to show that a battery 90 is OK; to show that the analog value from the ADC 114 is within an acceptable range of values; to show an on/off input or output state).

Figure 6:
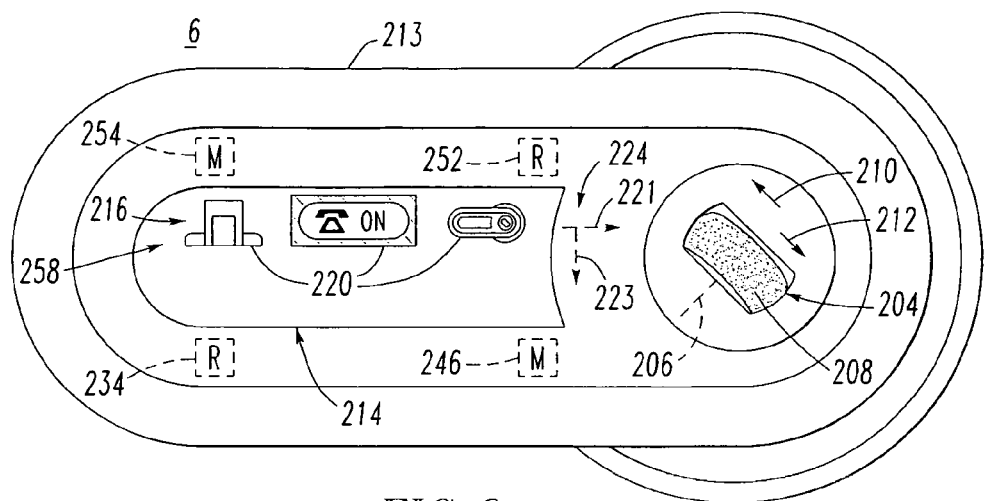
FIG. 6 is a plan view of the fob of FIG. 1.

Referring to FIG. 6, the fob 6 includes an input apparatus 204 having, for example, a rotational axis 206 (shown in hidden line drawing) and a wheel, such as a thumbwheel 208, adapted to rotate about the rotational axis 206 in a first rotational direction 210 and an opposite second rotational direction 212. The fob 6 further includes a portable housing 213 and a display 214. The display 214 may, for example, alternatively display a first list 216 and one or more second lists, such as 318 of FIG. 12B. The example first list 216 includes a plurality of first objects, such as icons 220, disposed in a first longitudinal direction 221 (e.g., horizontal as shown in FIG. 6). The example second list 318 includes a plurality of second objects, such as menu items, disposed in a different second longitudinal direction 223 (e.g., vertical as shown in FIG. 6). The fob 6 also includes a suitable processor component 224 (as best shown in FIG. 3) cooperating with the input apparatus 204 and the display 214 to scroll the first objects or the second objects responsive to rotation of the thumbwheel 208 in the first rotational direction 210 or the opposite second rotational direction 212. As shown in FIG. 6, the rotational axis 206 is preferably disposed at an angle of about 45 degrees with respect to the first or horizontal longitudinal direction 221 and to the second or vertical longitudinal direction 223.

The first rotational direction 210 corresponds to leftward scrolling and upward scrolling, while the second rotational direction 212 corresponds to rightward scrolling and downward scrolling. The horizontal list 216 of FIG. 6 is adapted to scroll leftward responsive to rotation of the thumbwheel 208 in the first rotational direction 210 and to scroll rightward responsive to rotation of the thumbwheel 208 in the second rotational direction 212. The vertical list 318 of FIG. 12B is adapted to scroll upward responsive to rotation of the thumbwheel 208 in the first rotational direction 210 and to scroll downward responsive to rotation of the thumbwheel 208 in the second rotational direction 212. Although an example input apparatus 204 and display 214 are disclosed, a wide range of suitable user interfaces may be employed.

In this example, the natural orientation for the fob 6, in order to take on the form of a "key," is horizontal with the thumbwheel 208 to one side (e.g., to the right side as shown in FIG. 6). However, in this example, this means that the fob 6 would, otherwise, have a "native" right-handedness that is more suitable for use by a right-handed user. Since it is desirable for the very same fob 6 to be employed by either right-handed or left-handed users, there is a need for setting the proper left or right "handedness" and for displaying information on the fob display 214 in the proper left-handed display orientation (FIG. 9) or right-handed display orientation (FIG. 6) for optimal usage. As a result, the proximity sensors 73,74 (FIG. 3) of the fob 6 and/or the proximity sensors 41,42 of the base station 4 (FIG. 2) are employed to establish the proper display orientation as is discussed below.

Figure 7:
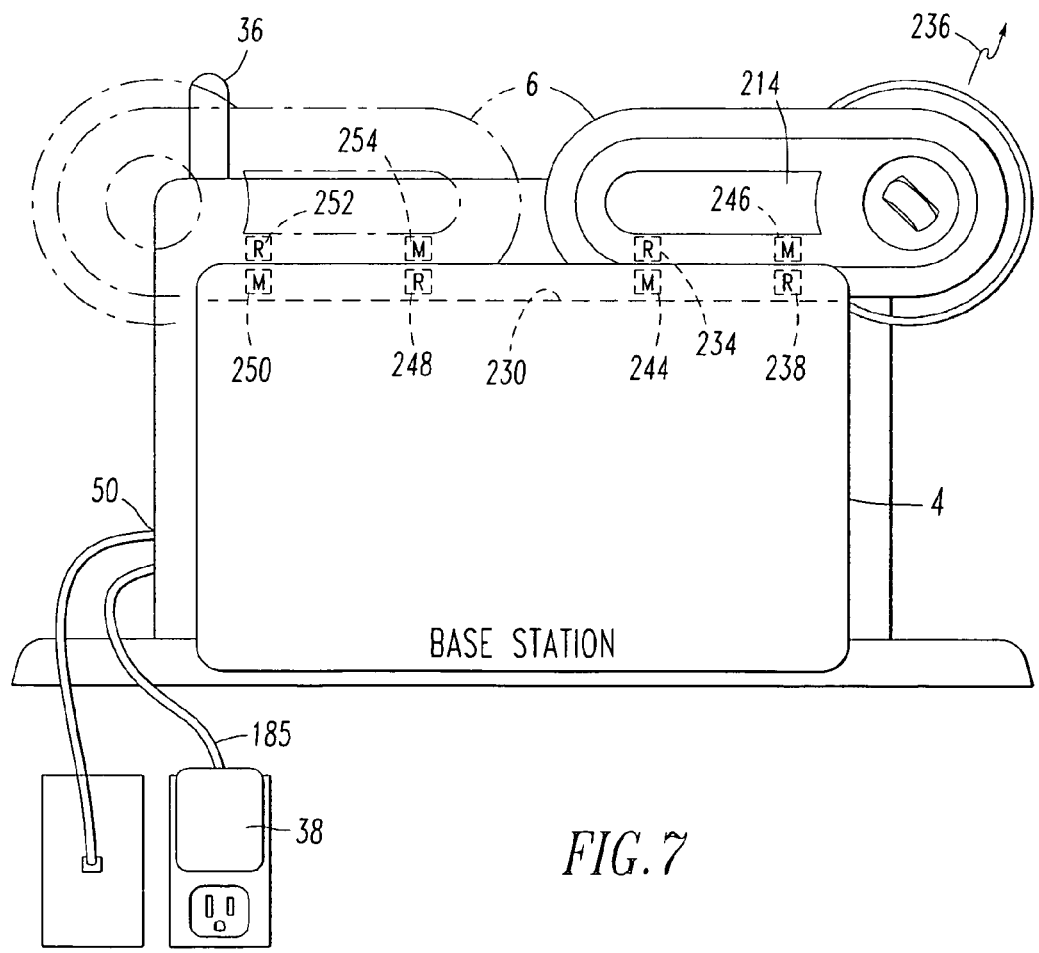
FIG. 7 is a vertical elevation view of the fob mating with the base station of FIG. 1.
Figure 8:
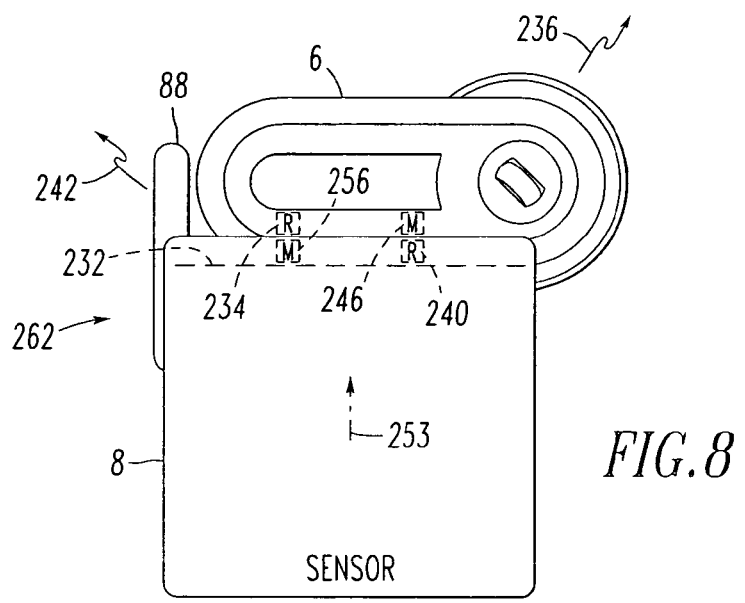
FIG. 8 is a vertical elevation view of the fob mating with the sensor of FIG. 1.

Referring to FIGS. 7 and 8, the home system 2 of FIG. 1 allows for a "tear off" display in the form of the fob 6 to be employed for configuration of the nodes 4,6,8,10,12 of such system. This is made possible by the headless base station 4 and the removable (e.g., with respect to the base station 4) fob 6. This removable fob 6 mates (e.g., "docks") in channel(s) (e.g., keyway(s)) 230 (shown in hidden line drawing in FIG. 7) and 232 (shown in hidden line drawing in FIG. 8) of the nodes 4,8,10,12 and signals its readiness to display information through, for example, an embedded proximity sensor (R) 234 and an RF message 236. Initially, the fob 6 is mated with the base station 4 as shown in FIG. 7. Then, to configure additional nodes, such as 8,10,12, to the system 2, the fob 6 is removed from the base station 4 and is mated with (e.g., "docked" in the channel 232 of) the selected node, such as 8 of FIG. 8, at which time the proximity sensors 234 and 238 in the fob 6 and the base station 4, respectively, or the proximity sensors 234 and 240 in the fob 6 and the sensor 8, respectively, are active. In response, the fob 6 and the mated node 8 preferably contemporaneously send RF messages 236 and 242 (FIG. 8), respectively, to the base station 4. Then, as is discussed below in connection with FIGS. 12B and 13B, when the base station 4 receives those messages 236,242, it coordinates the display of sensor or device specific configuration information, which is displayed by the fob 6.

With reference to FIG. 7, the fob 6 knows that it was mated with the right side (by a right-handed person) or the left side (by a left-handed person) of the base station 4, since the base station 4 has two proximity sensors 238,248 and two magnets 244,250 on each side thereof. In FIG. 7, the fob 6 is being configured, as shown, for the first display orientation 258 (FIGS. 3 and 6) for a right-handed user and, alternatively (as shown in phantom line drawing), for the second display orientation 260 (FIG. 3) for a left-handed user.

The fob 6 also has two proximity sensors 234,252 and two magnets 246,254. In accordance with a preferred practice, the base PIC processor 22 (FIG. 2) determines in which direction the fob 6 is mated (e.g., "docked") thereto based upon one of the base station proximity sensors 238,248 detecting a corresponding one of the respective magnets 246,254 of the fob 6. Then, the base station 4 informs the fob 6 that the corresponding right-handed/left-handed display orientation is the fob's "native" setting in the RF message 394. This message is employed to configure or predetermine the up/down orientation of the fob display 214.

The base station 4 "sets" the fob's "handedness" and resets it anytime the user re-docks the fob 6 with the base station 4 from a given left or right (with respect to FIG. 7) direction. Thus, the fob 6 may be removed from and re-mated with the base station 4 in the same or different mating orientation. This results in another RF message 394 (FIG. 13A) including the corresponding state 399 (e.g., a first state or a second state) of subsequent message 400 responsive to the right-handed or left-handed mating orientation of the most recent mating, which may be advantageously employed to re-configure the fob display 214 in the desired right-handed or left-handed display orientation.

For the fob 6 and the base station 4, each of which has two sets of magnets and two sets of proximity sensors as is shown in FIG. 7, based upon the particular activated proximity sensor in the base station 4, the base station 4, from that information, knows whether the fob 6 is being trained for a left-handed user or a right-handed user. Then, the base station 4 sends the fob 6 the RF message 394 (FIG. 13A) to inform it of the selected right-handed or left-handed display orientation. For example, the state 399 of subsequent message 400 includes one of a first state for a right-handed display orientation and a second state for a left-handed display orientation. Thus, the mating with the base station 4 is the automatic "default setter" for the system's fobs, such as 6.

Although not required, the fob 6 may advantageously compare the state 399 with the activated one of its two proximity sensors 234,252 to make sure that they both agree. The base station 4 also stores this "handedness" profile information for the fob 6 in the internal table 393 (FIG. 13A) of the base station 4, in order that, for example, if the fob runs out of battery power and is reset, then it may learn again from the base station 4 what handedness to be. Hence, if the fob 6 is re-powered and reset, then the base station 4 may send another wireless message to the fob 6 to reconfigure the display 214 in the predetermined display orientation. Therefore, the default or "native" user orientation of the fob 6 is always set by the base station 4 whenever the fob 6 is mated thereto.

For example, the proximity sensors 238,248 and 234,252 may be embedded magnetic switches. This permits a "sealed" and relatively more robust embedded application.

As will be discussed below in connection with FIGS. 12A-12B and 13A-13B, the fob 6 senses that one of its proximity sensors 234,252 is active during mating with the base station 4 or with another node, such as the sensor 8.

With reference to FIGS. 6 and 8, the fob 6 knows the "up" or "native" orientation 253 of an input sensor, such as 8,10, or output device, such as 12, since the fob 6 detects which one of the two proximity sensors 234,252 is active. The fob 6 positions the two proximity sensors 234,252 and the two magnets 246,254 toward opposite corners of the fob 6 (FIG. 6) such that they don't activate themselves. For example, the fob proximity sensor 234 senses the magnet 256 embedded in the sensor 8 and the sensor proximity sensor 240 senses the magnet 246 embedded in the fob 6.

Figure 11:
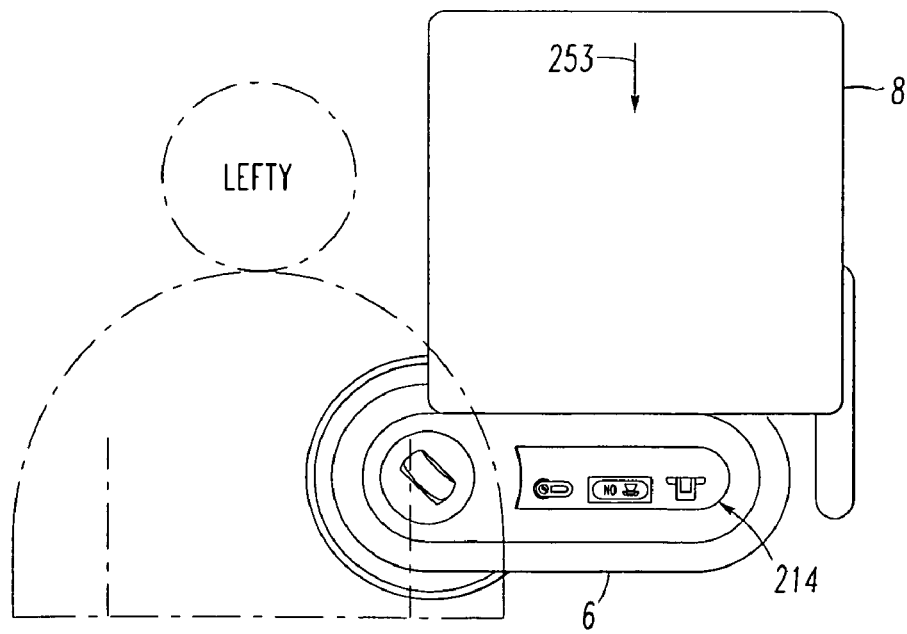
FIG. 11 is a vertical elevation view of the fob of FIG. 9 mating with the sensor of FIG. 8, except that the sensor and the fob are inverted.

As shown in FIG. 8, when the fob 6 is mated with the sensor 8 to form sub-system 262, one of the fob proximity sensors 234,252 that is closest to the sensor magnet 256 is active. Here, in this example, the proximity sensor 234 being active selects the right-handed display orientation, which corresponds to the "up" orientation 253 of the sensor 8. While mated with the sensor 8, the fob display 214 is always oriented to match the sensor's "native" orientation 253. If the sensor 8 is physically upside down, as shown in FIG. 11, then the fob 6 displays information in its display 214 "upside down" in the same right-handed display orientation even though, in this example, the user is left-handed (or is right-handed). In FIG. 11, the fob 6 was previously configured for a left-handed user and is mating with the sensor 8 of FIG. 8, except that the sensor 8 is inverted. Hence, if the sensor 8 is upside down, then the display orientation of the fob display 214 is also upside down when the fob 6 is mated with that inverted sensor.

The sensors 8,10 and devices, such as 12, have the channel 232 into which the fob 6 can be mated in either direction, one magnet 256 and one proximity sensor 240. This is because the sensors 8,10 and the device 12, unlike the base station 4, do not need to sense an alternate channel entry. Those nodes 8,10,12 only need to send a "training" RF message 420 (FIG. 13B) to the base station 4. The sensor 8, for example, is relatively narrow and works by having its one channel 232 situated centrally. Alternatively, if the fob 6 is reversed (not shown) to mate in the channel 232 in the opposite direction (e.g., with the fob proximity sensor 252 being activated by the sensor magnet 256, and with the sensor proximity sensor 240 being activated by the fob magnet 254), then this selects the left-handed display orientation, which, again, corresponds to the "up" orientation 253 of the sensor 8. In the example shown in FIG. 8, the proximity sensor 234 being active selects the right-handed display orientation, which corresponds to the "up" orientation 253 of the sensor 8.

Therefore, if the fob 6 is mated with one of the nodes 8,10,12, then the fob 6 assumes the node's "up" orientation 253 as is shown in FIGS. 8 and 11. The sensor 8 does not tell the fob 6 anything regarding the display orientation through a wireless message. Instead, the sensor 8 employs the magnet 256 that activates one of the fob's two proximity sensors 234,252. Again, this depends upon the way the fob 6 is mated with (e.g., inserted into) the sensor's training channel 232.

In FIG. 11, the position of the fob 6 and the sensor 8 are both inverted with respect to the non-inverted position of FIG. 8. This reinforces the integration of the fob 6 as a native part of any given node when it is mated thereto. This also benefits by supporting the use of the fob 6 as a "tear off" display that defaults to the user's preferences. The fob 6 determines the first or second mating orientation from the one of the first or second proximity sensors 234,252 being active. The fob 6 reconfigures the first (e.g., right-handed) display orientation responsive to the determined first mating orientation (FIG. 8) from the first proximity sensor 234 being active, or the second (e.g., left-handed) display orientation responsive to the determined second mating orientation (not shown with the sensor 8, but shown with the base station 4 of FIG. 7 in phantom line drawing) from the second proximity sensor 252 being active. Hence, the fob display 214 automatically changes to the sensor's "up" orientation 253, no matter how the sensor 8 is oriented.

When the fob 6 is removed from any of the nodes 8,10,12, such as the sensor 8, at any time during interaction or mating therewith, the fob 6 automatically restores (e.g., reverts back to) the user's native display orientation (i.e., left-handed (as shown in FIG. 9) or right-handed (as shown in FIG. 6)). This is because when the user removes the fob 6 from the sensor 8, it is most likely that the user wishes to read the fob display 214 or to adjust it using the user's native handedness.

Figure 10:
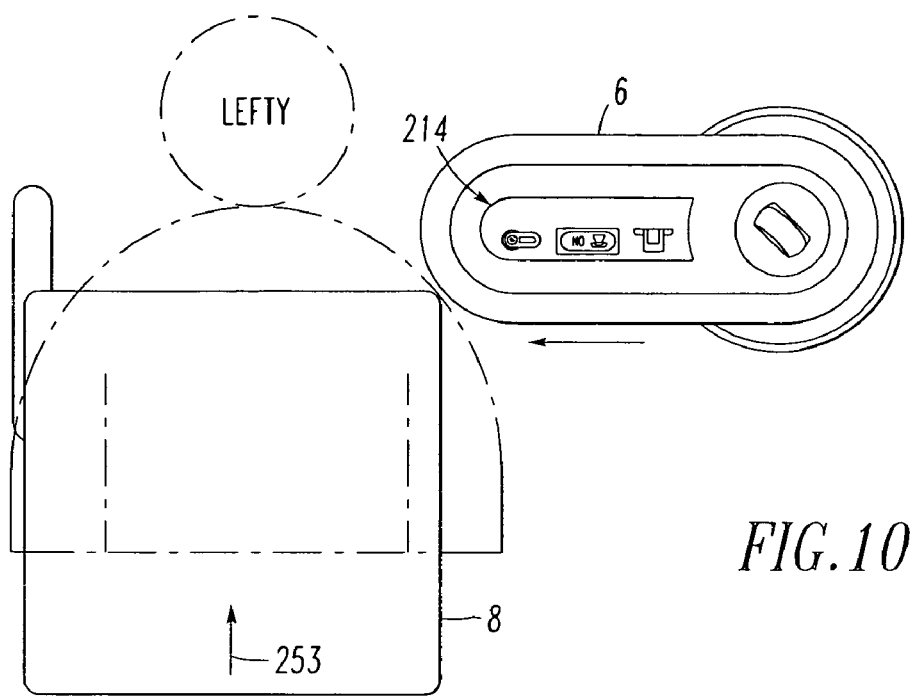
FIG. 10 is vertical elevation view of the fob of FIG. 9 just prior to mating with the sensor of FIG. 8 with the fob display still being configured for the left-handed user.

FIG. 10 shows the fob 6 of FIG. 9 just prior to mating with the sensor 8 of FIG. 8, with the fob display 214 still being configured for the left-handed user. Here, because the fob 6, which has not yet mated with the sensor 8, is physically inverted (by the left-handed person), the fob display 214 is also physically inverted. In contrast, in FIG. 11, the fob 6 is non-inverted (for the left-handed person), but the fob 6 has mated with the physically inverted sensor 8, such that the fob display 214 is also inverted to correspond to the sensor's "up" orientation 253, which is down in FIG. 11.

Figure 12A:
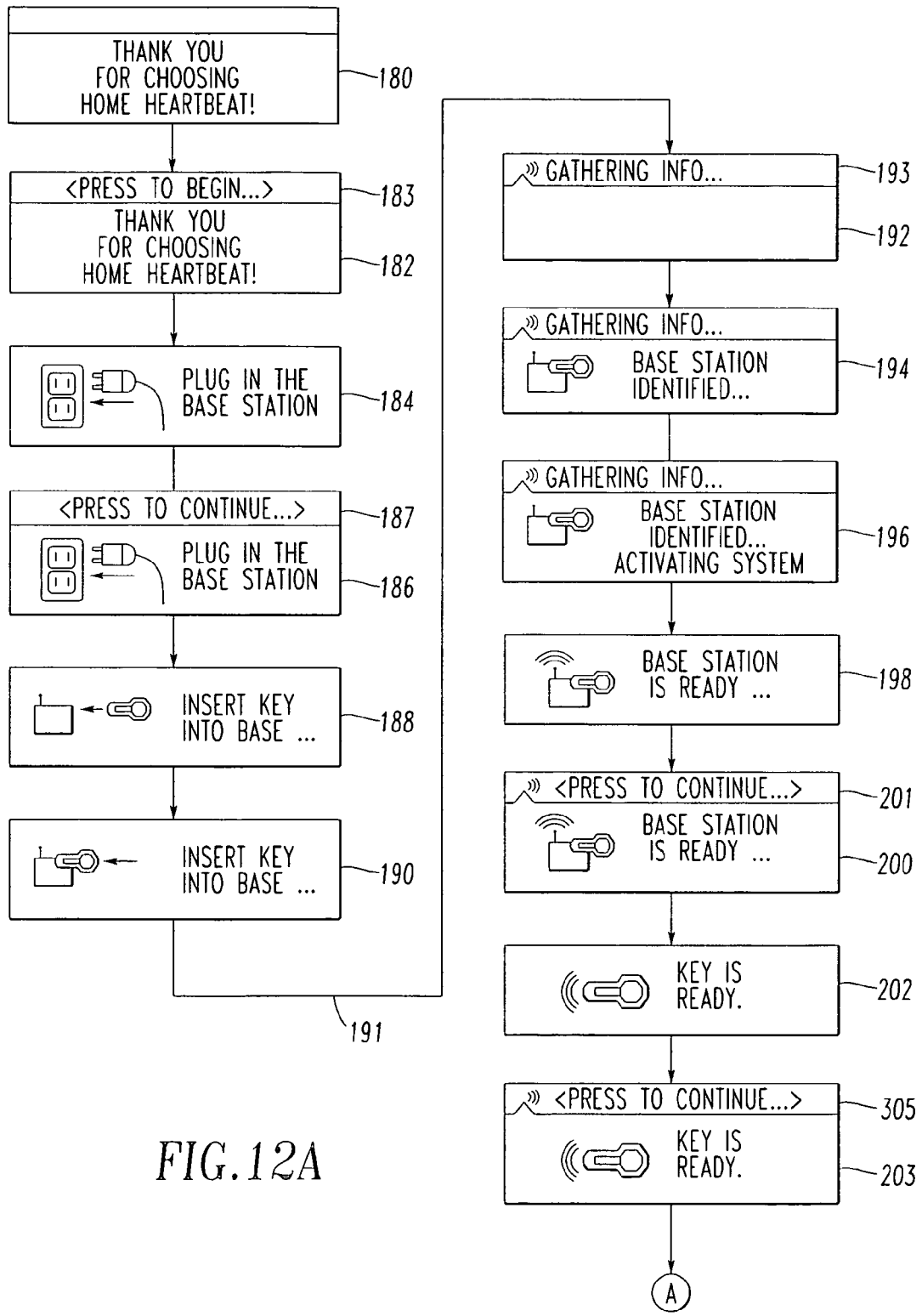
FIGS. 12A and 12B are examples of display sequences used by the fob for configuring the base station and sensors, respectively, of FIG. 1.
Figure 12B:
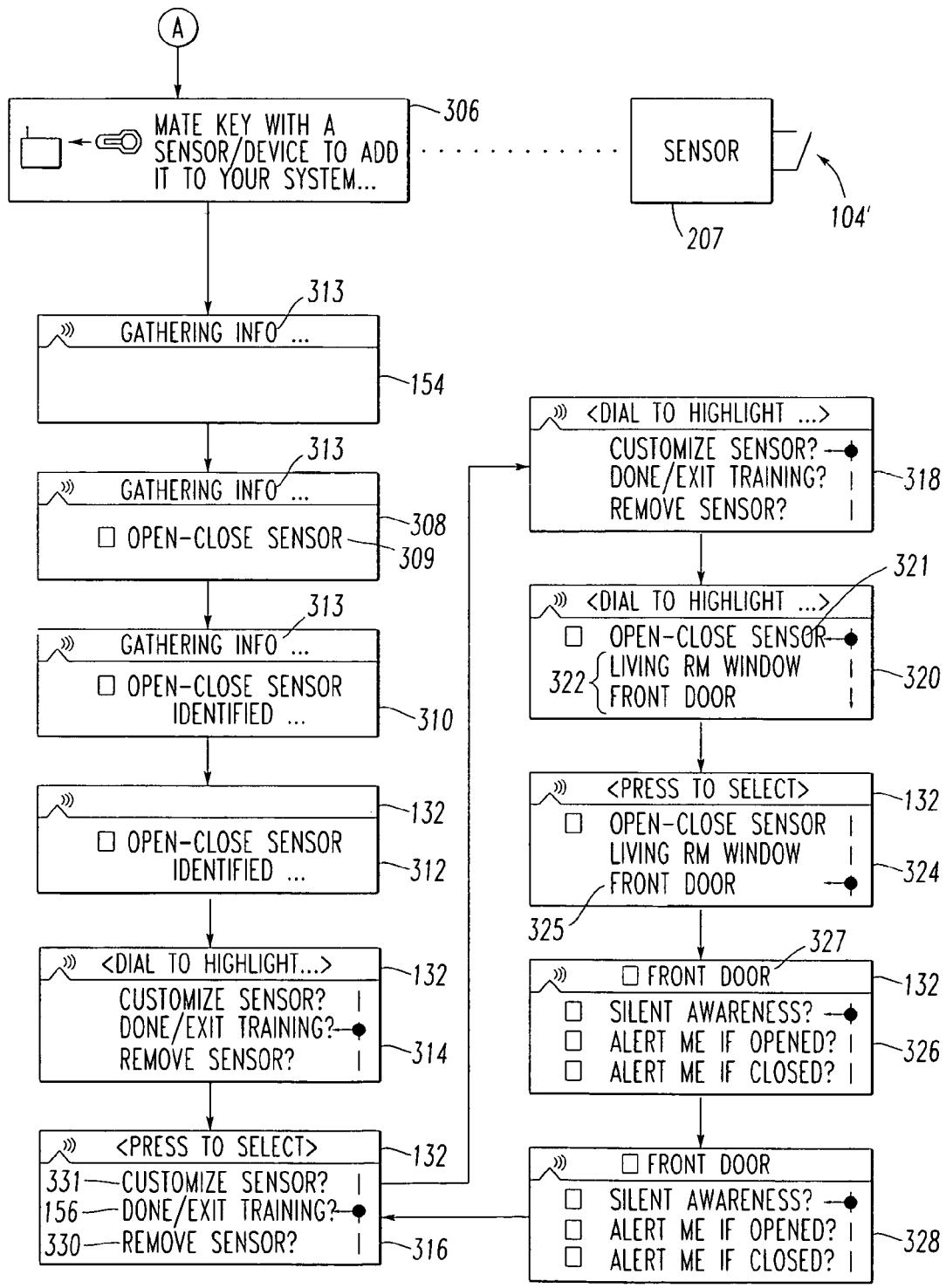

FIGS. 12A and 12B show sequences of displays employed by the fob 6 for configuring the base station 4 and the nodes 8,10,12, respectively, of FIG. 1. FIG. 12A shows a set of fob display screens that the user employs to configure the fob 6 and base station 4. First, screen 180 thanks the user for choosing the system 2. This is followed by screen 182, which prompts the user, at 183, to press the button 77 of FIG. 3 to begin (e.g., normal to the rotational axis 206 of the thumbwheel 208 of FIG. 6). The next two screens 184,186 respectively instruct the user to power (e.g., plug in an AC power cord 185 (FIG. 7)) the base station 4 and prompt the user, at 187, to press the button 77 to continue. The next two screens 188,190 graphically inform the user to insert the fob 6 into the base station 4 (e.g., into the channel 230 on the top of the base station 4). Those screens 188,190 are preferably repeated until the fob PIC processor 54 detects that one of the sensor/base/device proximity sensors 73,74 is active or closed. This occurs when the user slides the fob 6 into the channel 230 as far as it will go either from the left to the right side of FIG. 7 or from the right to the left side of FIG. 7. When that proximity sensor is active or closed in response to the fob 6 being suitably mated with the base station 4, the screen 190 transitions, at 191, to the screen 192, which informs the user, at 193, that the fob 6 is gathering (or exchanging) information with the base station 4 (e.g., the ID of the fob 6 is sent to the base station 4 via the RF transceivers over the wireless network 20, the ID of the base station 4 is sent to the fob 6, and other pertinent data is provided from the base station 4 to the fob 6) by exchanging a series of messages (not shown). Next, the user is informed by screen 194 that the base station 4 has been identified, by screen 196 that the system 2 is being activated, and by screen 198 that the base station 4 is ready (e.g., initialization is complete). Then, screen 200 prompts the user, at 201, to press the button 77 to continue. In response to that action, screen 202 (e.g., "Key is ready."; "Key is now joined to system.") informs the user that the fob 6 is ready and, thus, that the fob RAM memory 60 (FIG. 3) includes, for example, the particular node ID of the base station 4 and that both the fob 6 and base station 4 are part of the system 2. In accordance with a preferred practice of the invention, the fob display sets the user's native mode of display based upon whether the fob 6 is inserted from the right side (e.g., right-handed) or the left side (e.g., left-handed) of the base station 4 of FIG. 7. Finally, screen 203 prompts the user, at 305, to press the button 77 to continue. When that action occurs, execution resumes with screen 306 of FIG. 12B.

At screen 306 of FIG. 12B, the user is instructed to mate the fob 6 with a sensor (e.g., a non-configured sensor 207) or output device (e.g., device 12 of FIG. 1 prior to it being added) in order to add it to the system 2 of FIG. 1. For example, the user slides the fob 6 into the channel 232 on the top of the sensor 8 as far as it will go in order to automatically train the sensor. The user may remove the fob 6 from the sensor 8 at any time and the user will still be able to wirelessly set the training options for the sensor. If the user is left-handed, the fob display 214 will appear in the orientation of FIGS. 9 and 10, albeit with displayed information corresponding to the particular phase of training.

In summary, when one of the nodes 8,10,12 is keyed in this manner, the fob 6 begins gathering corresponding information and, then, reports the success to the user. As is discussed below, the fob 6 provides the ability to customize the sensor 207, with the status bar 132 cycling through two messages "<dial to highlight . . . >" and "press to select>". Following the screen 306, the screen 154 reports that the fob 6 is gathering information. This is possible, because there are two, and only two, nodes in the system 2 (e.g., the fob 6 and the particular sensor 207 (or the base station 4 or device 12), which are mated and which have their corresponding proximity sensors 73 or 74 and 104 or 104' closed or active at any one time). As is discussed below in connection with FIG. 13B, when the sensor proximity sensor 104' is closed or activated by mating with the fob 6, the sensor 207 sends a request to the base station 4 to join the network 20 (attempt_network_discovery). One of the fob proximity sensors 73,74 is also closed or activated (e.g., simultaneously) by mating with the sensor 207, and the fob 6 also sends a "program sensor" message to the base station 4. By receiving this "confirmation" message from the fob 6, the base station 4 knows to accept this sensor 207 to the network 20, and sends a nwk_connect_confirm message. Next, screen 308 reports the type of sensor (e.g., an Open-Close Sensor 309 in this example). Then, screen 310 reports that the sensor 207 is identified and screen 312 removes the "<gathering info . . . >" message 313 from the status bar 132.

Next, the screens 314 and 316 prompt the user to "<dial to highlight . . . >" and "<press to select>" one of the three displayed actions: "Customize sensor?", "Done/Exit Training?" And "Remove Sensor?". If the user highlights and presses (e.g., employing the button 77 of FIG. 3) "Customize sensor?" at screen 318, then screen 320 is displayed, which confirms that the sensor 207 is an "Open-Close Sensor" 321 and lists in the lower rotary (configuration) menu 322 the possible names of that sensor. In this example, there are two possible names shown, which are based upon the possible locations for such a sensor: Living R(oo)m Window and Front Door, wherein the parenthetical portion of those names is truncated for display in this example. Also, in this example, there may be one, three or more names and the display operation of the rotary (configuration) menu 322. Next, after the user highlights one of the names, such as Front Door 325, the screen 324 prompts the user to press the button 77 of FIG. 3 to select that name. Next, after the user selects the name, the screen 326 displays the name, Front Door 327, in the system message region 132, and prompts the user to select one of the sensor awareness levels, for example, "Silent awareness?", "Alert me if opened?" and "Alert me if closed?". Although, zero, one, two, three or more awareness levels may be employed for a particular sensor, in this example, "Silent Awareness?" means that the audible buzzer 84 (FIG. 3) of the fob 6 is inactive regardless of the state of that sensor. Otherwise, the user can select that an audible alert as determined by the base station 4 be sounded if that configured sensor is opened or if such sensor is closed. Next, at screen 328, the user, in this example, selects "Silent awareness?", which causes the screen 316 to be redisplayed. At that point, if the user highlights and selects the "Done/Exit Training?" option 156, then the newly entered information for the sensor 207 is transferred to the base station 4. Alternatively, if the user highlights and selects the "Remove sensor?" option 330, and regardless whether the sensor 207 was previously added, that information for such sensor is transferred to the base station 4, in order to remove the sensor 207 from the system 2. Finally, if the user highlights and selects the "Customize sensor?" option 331, screen 318 is redisplayed, no information is sent to the base station 4, and the user is prompted to re-enter the information to customize the sensor 207.

Figure 13A:
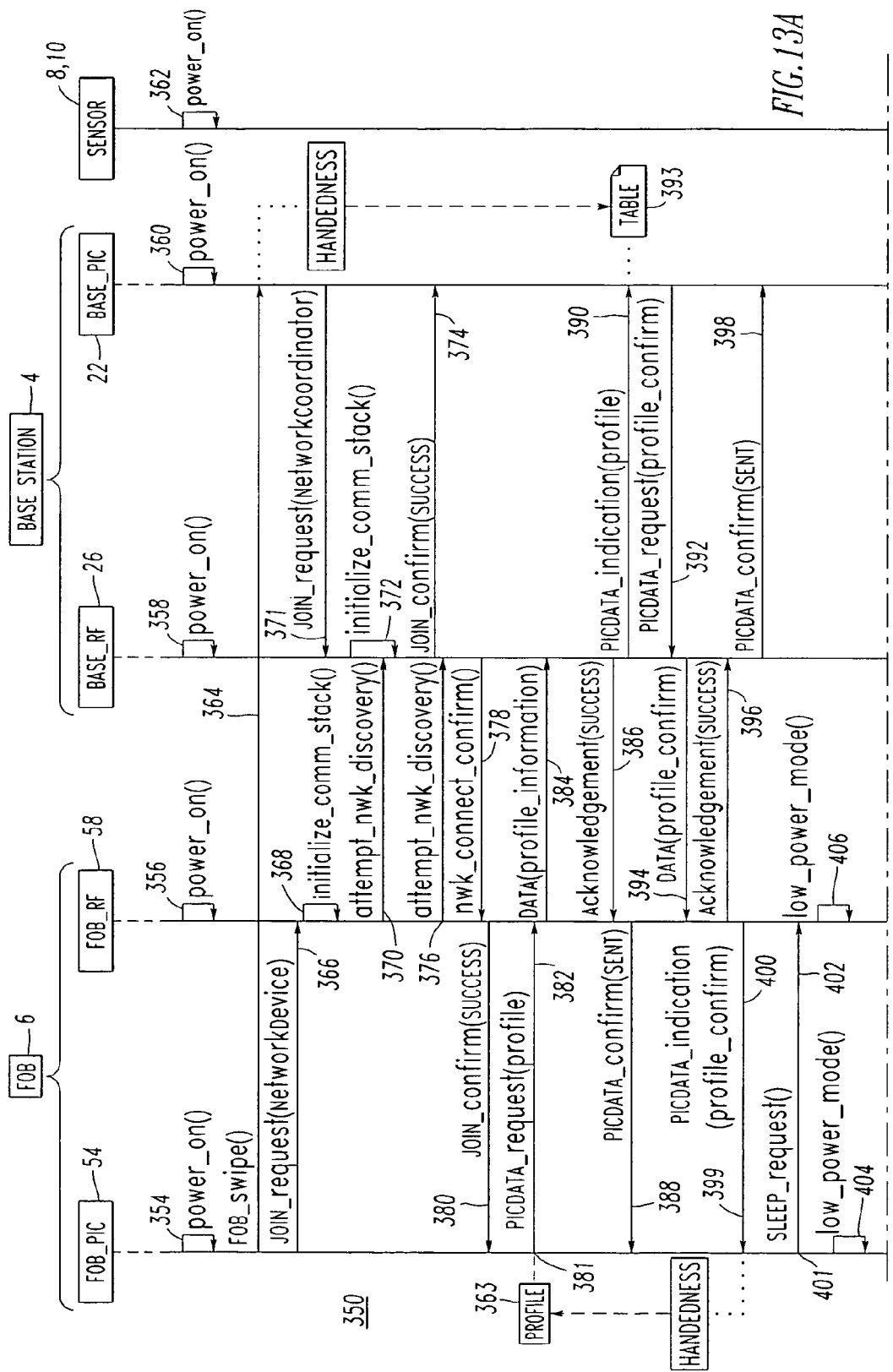
FIGS. 13A and 13B are message flow diagrams showing the interaction between the fob, one of the sensors and the base station of FIG. 1 for configuring the fob and the sensor, respectively.
Figure 13B:
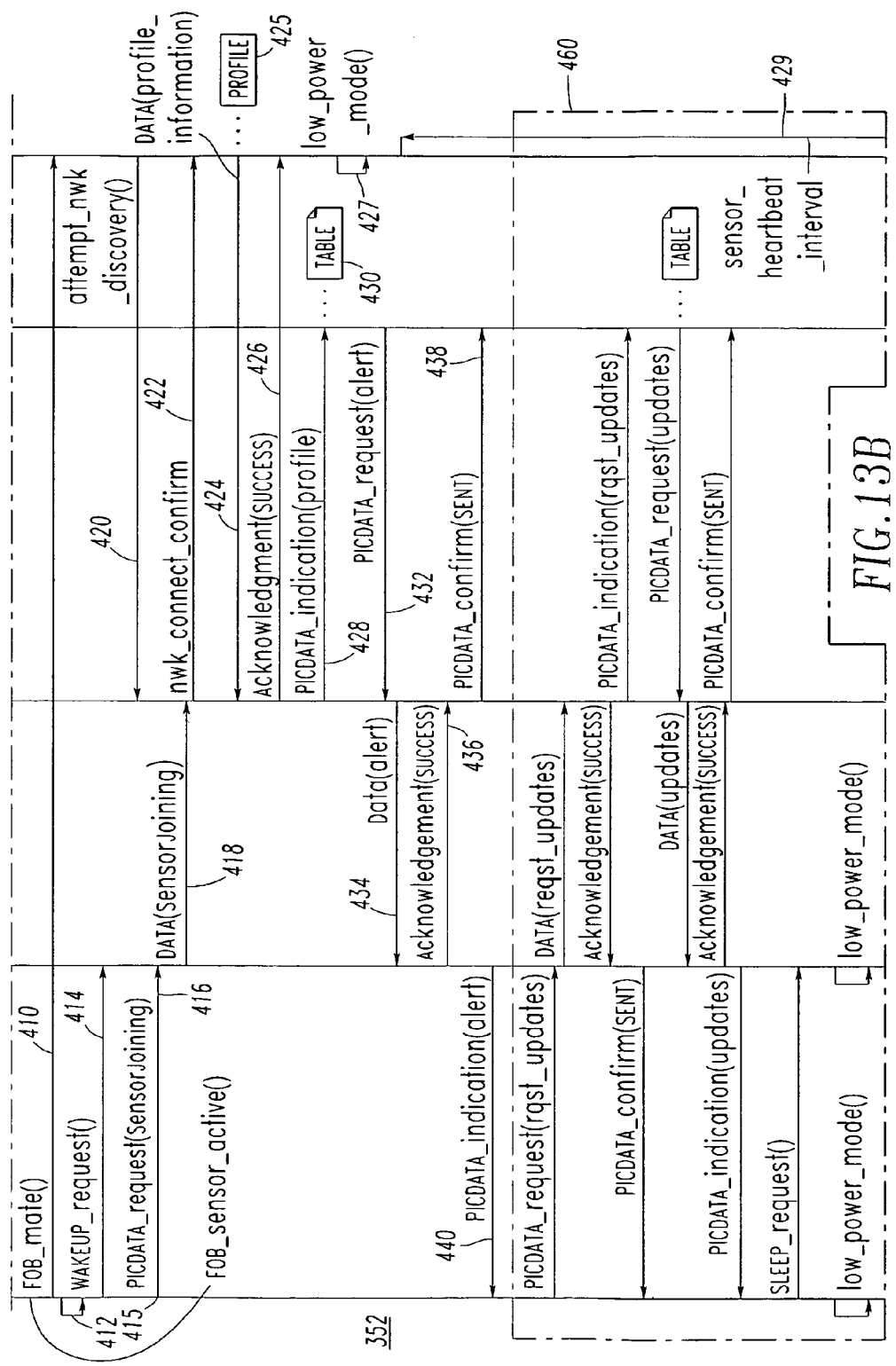

FIGS. 13A and 13B are message flow diagrams 350,352 showing the interaction between the fob 6, one sensor, such as 10, and the base station 4 of FIG. 1 for configuring that fob and sensor. In FIG. 13A, after the four processors 54,58,26,22 complete respective power_on( ) initialization 354,356,358, 360, the fob 6 may join the network 20 of the base station 4. The sensor 10 also initiates power_on( ) initialization 362.

Initially, in response to the screens 188,190 of FIG. 12A, the user undertakes a FOB_swipe( ) 364 of the fob 6 with the base station 4. In view of the screens 188,190, the fob PIC processor 54 knows, at this point, that the mated node is the base station 4. The fob PIC processor 54 detects the activation or closure of one of the sensor/base station/device proximity sensors 73,74 of FIG. 3 and responsively sends a JOIN_request(NetworkDevice) message 366 to the fob RF processor 58, which responsively executes an initialize_comm_stack( ) routine 368. This routine 368 initializes the communication stack of that processor, which provides suitable software services for communication from one RF node (e.g., the fob 6) to another RF node (e.g., the base station 4). Next, the fob RF processor 58 sends an attempt_nwk_discovery( ) RF message 370 to the base RF processor 26, which may or may not be ready for that message. Only after the base station 4 has successfully initialized, will these discovery attempts of the fob 6 be successful. At that point, the fob 6 can transmit its profile 363 to the base station 4.

When the base PIC processor 22 is notified, as a result of the FOB_swipe( ) 364 of the fob 6 with the base station 4, of the closure or activation of one of the proximity sensors 41,42 of FIG. 2, it responsively sends a JOIN_request(NetworkCoordinator) 371 message to the base RF processor 26, which responsively executes an initialize_comm_stack( ) routine 372. As a result, the base communication stack is initialized and the base RF processor 26 is ready to accept requests from other nodes to join the network 20 of FIG. 1. When the routine 372 concludes, the base RF processor 26 sends a JOIN_confirm(SUCCESS) message 374 back to the base PIC processor 22. Therefore, the base RF processor 26 is now ready to accept requests from other nodes (e.g., the sensor 10; the fob 6) to join the network 20.

Although the first attempt_nwk_discovery( ) RF message 370 to the base RF processor 26 was ignored, since the routine 372 had not yet concluded, a second or subsequent attempt_nwk_discovery( ) RF message, such as 376, is sent to and is received by the base RF processor 26. That processor 26 receives the message 376 and responds with a nwk_connect_confirm( ) RF message 378 back to the fob RF processor 58.

When the message 378 is received, the fob RF processor 58 sends a JOIN_confirm(SUCCESS) message 380 back to the base PIC processor 54.

The profile 363, for a node such as the fob 6, includes suitable node identification information, which, for example, identifies the node as a fob and provides the node ID and any attributes thereof. The profile 363 is transmitted to the base RF processor 26 after the fob RF processor 58 has joined the network 20 of FIG. 1. In this regard, the fob RF processor 58 may periodically attempt that action as shown by the example sequence of two attempt_nwk_discovery( ) RF messages 370,376 to the base RF processor 26. It will be appreciated that one or more of such attempts are employed. Also, such attempts at discovery may be employed after power is on and independent of the engagement of the fob 6 with the base station 4.

At 381, the fob 6 can transmit its profile 363 to the base station 4. The fob PIC processor 54 sends a PICDATA_request(profile) message 382 to the fob RF processor 58, which responsively sends a DATA(profile_information) RF message 384. That message 384 is received by the base RF processor 26. In response, that processor 26 sends an Acknowledgement(SUCCESS) RF message 386 back to the fob RF processor 58. Upon receipt of that message 386 by the fob RF processor 58, it sends a PICDATA_confirm(SENT) message 388 back to the fob PIC processor 54.

After sending the Acknowledgement(SUCCESS) RF message 386, the base RF processor 26 sends a PICDATA_indication(profile) message 390 to the base PIC processor 22. Upon receipt of the message 390, the base PIC processor 22 sends a PICDATA_request(profile_confirm) message 392 to the base RF processor 26 and, also, stores the profile 363 for the fob 6 in an internal table 393 of nodes, which have been added to the network 20. Upon receipt of the message 392, the base RF processor 26 sends a DATA(profile_confirm) RF message 394 to the fob RF processor 58. Upon receipt of that message 394 by the fob RF processor 58, it sends an Acknowledgement(SUCCESS) RF message 396 back to the base RF processor 26 and sends a PICDATA_indication(profile_confirm) message 400 back to the fob PIC processor 54. In response to receipt of that message 400, the fob PIC processor 54 displays the fob acceptance screen 202 of FIG. 12A to the user. Upon receipt of the RF message 396, the base RF processor 26 sends a PICDATA_confirm(SENT) message 398 to the base PIC processor 22. Finally, at 401, the fob PIC processor 54 sends a SLEEP_request( ) message 402 to the fob RF processor 58 and both fob processors 54,58 enter a low_power_mode( ) 404,406, respectively.

Referring to FIG. 13B, in order to join one of the sensors, such as 10, to the network 20 of FIG. 1, the user suitably mates the fob 6 with that sensor. In response, the fob PIC processor 54 detects one of the sensor/base station/device proximity sensors 73,74 of FIG. 3 being closed or active. The screen 154 of FIG. 12B may say "please wait . . ." (not shown) because, at this point, one of the fob proximity sensors 73,74 (FIG. 3) has been activated. At this point, the fob 6 does not know the nature of the mated node (e.g., whether it is a device, sensor or base station), since, for example, a stray magnet (not shown) might have triggered one of its proximity sensors 73,74. As will be discussed, the fob 6 then sends out the RF message 418 and the sensor 8 sends out the RF message 420. The base station 4 receives both RF messages 418,420 and, then, the fob 6 finds out that the mated node is a sensor and displays "sensor/device found" (not shown) and "gathering info" 313 (FIG. 12B). Otherwise, the fob 6 just displays "please wait . . ." for a suitable time (e.g., a few seconds) and then goes back to its home screen (not shown) because it did not receive information from the base station 4 about the new sensor 8. Otherwise, in view of the screen 308 of FIG. 12B, the fob 6 knows, at this point, that the mated node is a sensor.

Following the FOB_sensor_active( ) routine 412, the fob PIC processor 54 send a WAKEUP_request( ) message 414 to the fob RF processor 58. Similar to the fob RF processor's RF messages 370,376, the sensor 10 periodically sends RF messages, such as the attempt_nwk_discovery( ) RF message 420, to the base RF processor 26. The RF message 420 wirelessly communicates a signature (e.g., address; serial number) of the sensor 10 to the base station 4. Otherwise, the sensor 10 goes to a low power mode, such as 427, if the network discovery attempts are unsuccessful. The sensor 10 then retries (not shown) such network discovery attempts after a suitable time in low power mode.

At 415, after sending the wakeup message 414, the fob PIC processor 54 sends a PICDATA_request(SensorJoining) message 416 to the fob RF processor 58, which, in turn, sends a DATA(SensorJoining) RF message 418 to the base RF processor 26. The action of the FOB_mate( ) 410 also causes the sensor 10 to detect the closure or activation of the sensor proximity sensor 104' of FIG. 5. Preferably, that action triggers the first RF message 420.

In view of the two RF messages 418,420 to the base RF processor 26, it responsively sends a nwk_connect_confirm( ) RF message 422 back to the sensor 10. Upon receipt of that RF message 422, the sensor 10 sends a DATA(profile_information) RF message 424 back to the base RF processor 26. That RF message 424 includes the sensor profile 425, which includes suitable node identification information, such as type of node (e.g., sensor), the type of sensor (e.g., on/off; one input; battery powered), the node ID and any suitable attributes of the sensor 10. Upon receipt of that RF message 424, the base RF processor 26 sends the sensor 10 an Acknowledgment(SUCCESS) RF message 426. Next, the base RF processor 26 sends the base PIC processor 22 a PICDATA_indication(profile) message 428, including the sensor profile 425. The base PIC processor 22 receives that message 428 and stores the profile 425 in the table 430. The base PIC processor 22 also sends the base RF processor 26 a PICDATA_request(alert) message 432, which indicates that a new sensor 10 has been added to network 20. As will be seen, this message 432 is ultimately communicated to the fob 6, which will, then, need to responsively request data associated with the newly added sensor 10.

After receiving the Acknowledgment(SUCCESS) RF message 426, the sensor 10 enters the low_power_mode( ) 427. In turn, after a suitable sensor_heartbeat_interval 429, the sensor 10 wakes up and responsively sends sensor data in an RF message (not shown) to the base station 4.

Upon receipt of the PICDATA_request(alert) message 432, the base RF processor 26 sends a Data(alert) RF message 434 to the fob RF processor 58, which receives that RF message 434 and responsively sends an Acknowledgement(SUCCESS) RF message 436 back to the base RF processor 26. Upon receipt of the RF message 436, the base RF processor 26 sends a PICDATA_confirm(SENT) message 438 to the base PIC processor 22. Then, after the fob RF processor 58 sends the RF message 436, it sends a PICDATA_indication (alert) message 440 to the fob PIC processor 54. Next, the message sequence 460 is executed to provide sensor information for the newly added sensor 10 to the fob 6.

As part of the sensor profile 425, the sensor 10 provides, for example, a node ID, a network address and/or a unique sensor serial number. As part of the messages 416,418, the fob 6 provides a graphical identifier (e.g., a label; sensor name; sensor attribute) associated with the configuration of the sensor (e.g., screen 324 of FIG. 12B provides the name "Front Door" 325 for the sensor being configured).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system for a structure, said system for a structure comprising:
   a server comprising a first wireless communication port and a second port;
   a handheld electronic device comprising a display and a third wireless communication port adapted to communicate with the first wireless communication port of said server, said display alternatively displaying a first display orientation and a second display orientation, said first display orientation being inverted with respect to said second display orientation; and
   at least one node different than said handheld electronic device,
   wherein said handheld electronic device is adapted to mate with the second port of said server in one of a first mating orientation and a different second mating orientation,
   wherein said server is adapted to send a wireless message from the first wireless communication port of said server to the third wireless communication port of said handheld electronic device, said wireless message including one of a first state corresponding to said first mating orientation and a different second state corresponding to said different second mating orientation, and
   wherein said handheld electronic device is further adapted to configure said display in the first display orientation responsive to said first state and to alternatively configure said display in the second display orientation responsive to said second state.

2. The system for a structure of claim 1 wherein said at least one node is one of an input sensor node and an output device node, said at least one node comprising a fourth wireless communication port adapted to send information to or receive information from the first wireless communication port of said server and a fifth port; and wherein said handheld electronic device further comprises a sixth port adapted to mate with the fifth port of said at least one node in one of a third mating orientation and a different fourth mating orientation, said handheld electronic device being adapted to reconfigure said display in the first display orientation responsive to said third mating orientation and to alternatively reconfigure said display in the second display orientation responsive to said fourth mating orientation.

3. The system for a structure of claim 1 wherein the second port of said server comprises a channel including a first end having a first proximity sensor and a first target and a second end having a second proximity sensor and a second target; wherein said handheld electronic device further comprises a first side including a first proximity sensor and a first target and an opposite second side including a second proximity sensor and a second target; and wherein the first side of said handheld electronic device mates with the channel of said server in the first mating orientation with the first proximity sensor of said handheld electronic device being proximate the first target of said server and with the first target of said handheld electronic device being proximate the first proximity sensor of said server, and the second side of said handheld electronic device alternatively mates with the channel of said server in the second mating orientation with the second proximity sensor of said handheld electronic device being proximate the second target of said server and with the second target of said handheld electronic device being proximate the second proximity sensor of said server.

4. The system for a structure of claim 3 wherein said handheld electronic device further comprises a processor adapted to determine the first and second mating orientations from the first and second proximity sensors of said handheld electronic device; wherein said server further comprises a processor adapted to determine the first and second mating orientations from the first and second proximity sensors of said server and to send said wireless message including one of said first state and said different second state; and wherein the processor of said handheld electronic device is further adapted to compare the first state or the second state of said wireless message with the first mating orientation or the second mating orientation from the first and second proximity sensors of said handheld electronic device before configuring said first display orientation responsive to said first state and said first mating orientation from the first proximity sensor of said handheld electronic device and before alternatively configuring said second display orientation responsive to said second state and said second mating orientation from the second proximity sensor of said handheld electronic device.

5. The system for a structure of claim 1 wherein said handheld electronic device further comprises a first side including a first proximity sensor and a first target and an opposite second side including a second proximity sensor and a second target; and wherein the display of said handheld electronic device is disposed between the first side and the opposite second side of said handheld electronic device.

6. The system for a structure of claim 5 wherein said handheld electronic device further comprises a user input device disposed proximate the display of said handheld electronic device, said user input device being between the first side and the opposite second side of said handheld electronic device.

7. A method of configuring a display orientation, said method comprising:
   employing a server comprising a first wireless communication port and a second port;
   employing a handheld electronic device comprising a display and a third wireless communication port adapted to communicate with the first wireless communication port of said server;
   alternatively displaying a first display orientation and a second display orientation of said display, said first display orientation being inverted with respect to said second display orientation;
   mating said handheld electronic device with the second port of said server in one of a first mating orientation and a different second mating orientation;
   sending a wireless message including a first state responsive to the first mating orientation and a different second state responsive to the second mating orientation from the first wireless communication port of said server to the third wireless communication port of said handheld electronic device; and
   configuring said display in the first display orientation responsive to said first state and alternatively configuring said display in the second display orientation responsive to said second state.

8. The method of claim 7 further comprising
disposing the display of said handheld electronic device between a first side and an opposite second side of said handheld electronic device;
disposing a user input device proximate said display and being between the first side and the opposite second side of said handheld electronic device; and
employing said first display orientation for a right-handed user and alternatively employing said second display orientation for a left-handed user.

9. The method of claim 7 further comprising
employing a channel in said server including a first end having a first proximity sensor and a first target and a second end having a second proximity sensor and a second target;
employing a first side including a first proximity sensor and a first target and an opposite second side including a second proximity sensor and a second target of said handheld electronic device;
mating the first side of said handheld electronic device with the channel of said server in the first mating orientation with the first proximity sensor of said handheld electronic device being proximate the first target of said server and with the first target of said handheld electronic device being proximate the first proximity sensor of said server, and responsively sending the wireless message including the first state; and
alternatively mating the second side of said handheld electronic device with the channel of said server in the second mating orientation with the second proximity sensor of said handheld electronic device being proximate the second target of said server and with the second target of said handheld electronic device being proximate the second proximity sensor of said server, and responsively sending the wireless message including the second state.

10. The method of claim 9 further comprising
determining the first and second mating orientations from the first and second proximity sensors of said handheld electronic device;
determining the first and second mating orientations from the first and second proximity sensors of said server and responsively sending said wireless message including one of the first state corresponding to said first mating orientation and the second state corresponding to said second mating orientation; and
comparing the first state or the second state of said wireless message with the first mating orientation or the second mating orientation from the first and second proximity sensors of said handheld electronic device before configuring said first display orientation responsive to said first state and said first mating orientation from the first proximity sensor of said handheld electronic device and before alternatively configuring said second display orientation responsive to said second state and said second mating orientation from the second proximity sensor of said handheld electronic device.

11. The method of claim 7 further comprising
re-powering and resetting said handheld electronic device;
storing the first state or the second state at said server; and
sending another wireless message from said server to said handheld electronic device to reconfigure said display in the first display orientation responsive to said first state and alternatively reconfiguring said display in the second display orientation responsive to said second state.

12. The method of claim 7 further comprising
including first and second proximity sensors with said handheld electronic device;
mating said handheld electronic device with a node different than said handheld electronic device;
determining the first and second mating orientations from the first and second proximity sensors of said handheld electronic device; and
reconfiguring said first display orientation responsive to said determined first mating orientation from the first proximity sensor of said handheld electronic device or said second display orientation responsive to said determined second mating orientation from the second proximity sensor of said handheld electronic device.

13. The method of claim 12 further comprising
employing an input sensor as said node;
employing a native orientation of said input sensor; and
reconfiguring said first display orientation corresponding to said native orientation responsive to said determined first mating orientation from the first proximity sensor of said handheld electronic device or reconfiguring said second display orientation, which does not correspond to said native orientation, responsive to said determined second mating orientation from the second proximity sensor of said handheld electronic device.

14. The method of claim 12 further comprising
removing said handheld electronic device from mating with said node different than said handheld electronic device; and
responsively restoring said first display orientation responsive to said first state and alternatively restoring said second display orientation responsive to said second state.

15. The method of claim 7 further comprising
removing said handheld electronic device from mating with the second port of said server;
re-mating said handheld electronic device with the second port of said server in one of the first mating orientation and the different second mating orientation;
sending another wireless message including a first state responsive to the first mating orientation and a different second state responsive to the second mating orientation from the first wireless communication port of said server to the third wireless communication port of said handheld electronic device; and
re-configuring said display in the first display orientation responsive to said first mating orientation and alternatively re-configuring said display in the second display orientation responsive to said second mating orientation.

16. The method of claim 7 further comprising
physically engaging said handheld electronic device with the second port of said server in one of the first mating orientation and the different second mating orientation, the first mating orientation being a first physical engagement orientation and the different second mating orientation being a second different physical engagement orientation.

17. A sub-system for monitoring, configuring or controlling a system for a structure, said sub-system comprising:
a node comprising a mating portion and a target; and
a handheld electronic device comprising:
a portable housing including a first side and an opposite second side, said first side being adapted to mate with the mating portion of said node in a first mating orientation, said second side being adapted to mate with the mating portion of said node in a different second mating orientation, a first proximity sensor disposed toward the first side of said portable housing, a second proximity sensor disposed toward the second side of said portable housing, a display disposed between the first and second sides of said portable housing, and a processor cooperating with said first and second proximity sensors and being adapted to configure said display in a first display orientation responsive to said first proximity sensor detecting the target of said node and to alternatively configure said display in a second display orientation responsive to said second proximity sensor detecting the target of said node, said first display orientation being inverted with respect to said second display orientation.

18. The sub-system of claim 17 wherein said first proximity sensor is structured to detect the target responsive to physical engagement of the first side of said portable housing with the mating portion of said node in a first physical engagement orientation; and wherein said second proximity sensor is structured to detect the target responsive to physical engagement of the second side of said portable housing with the mating portion of said node in a different second physical engagement orientation.

* * * * *